I. JENNINGS.
Paper-Pulp Distributor.
No. 7,962. Reissued Nov. 27, 1877.
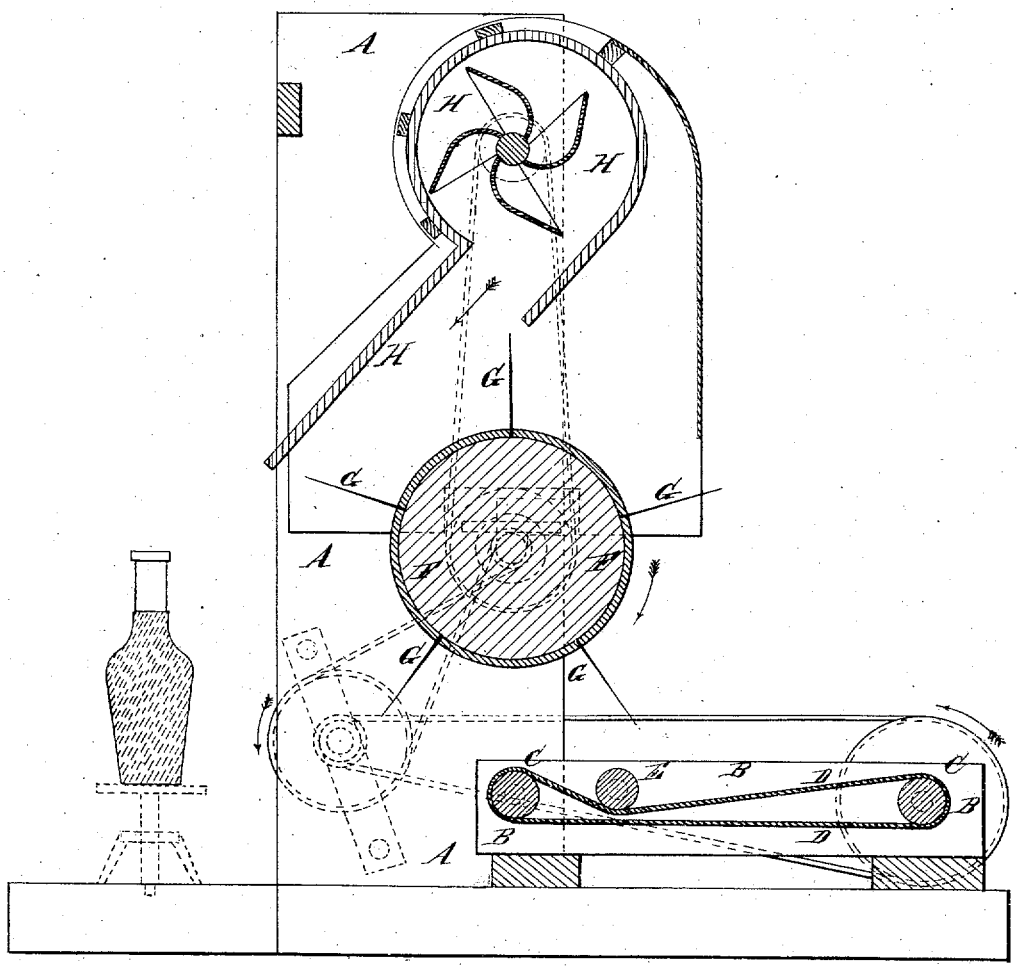
Inventor
Isaac Jennings,
By Thos. J. Keow
Atty
Witnesses.
W. L. Bennem.
James M. Hicks.

UNITED STATES PATENT OFFICE.

ISAAC JENNINGS, OF FAIRFIELD, CONNECTICUT.

IMPROVEMENT IN PAPER-PULP DISTRIBUTERS.

Specification forming part of Letters Patent No. 188,371, dated March 13, 1877; Reissue No. 7,962, dated November 27, 1877; application filed November 3, 1877.

*To all whom it may concern:*

Be it known that I, ISAAC JENNINGS, of Fairfield, in the county of Fairfield and State of Connecticut, have invented certain new and useful Improvements in Paper-Pulp Distributers, of which the following is a specification:

The accompanying drawing is a vertical section of my improved machine.

The object of this invention is to furnish an improved machine for depositing paper-pulp upon vessels and other forms to coat them, and which shall be simple in construction, convenient in use, and effective in operation.

The invention consists in the combination of the two frames, the endless carrier, and the drum, provided with the spring-fingers, with each other for depositing particles of paper-pulp upon articles to be coated; and in the combination of the fan-blower with the drum, provided with the spring-fingers, with the endless carrier, and the two frames, as hereinafter fully described.

A is an upright frame, to which is attached or pivoted a trough or frame, B. To the end parts of the frame B are pivoted two rollers, C, around which passes the endless belt or carrier D, made of wire-cloth or other suitable material.

To the forward part of the frame B is pivoted a third roller, E, beneath which the carrier D passes to hold the said carrier down, so that the distributing-fingers can only come in contact with its forward part.

The rear part of the frame B is designed to be lowered into the pulp-vat.

To the upright frame A, above the forward end of the carrier-frame, is pivoted a drum, F, to which are attached rows of spring-fingers G, of such length that their ends will come in contact with the forward end of the carrier D, to take particles of pulp from said carrier, which particles of pulp are projected by centrifugal force, and by the spring of the fingers G, upon the object to be coated, which object is placed in front of the machine, upon some suitable stand or holder, and should be slowly revolved.

The particles of pulp are directed more accurately against the article to be coated by the blast from a fan-blower, H, which is attached to a frame, A, above the drum F. Motion is given to the drum F by hand or from any convenient power. Motion is given to the fan-blower H and to the carrier D from the drum F by bands and pulleys.

In this way bottles, pitchers, and other vessels may be quickly and evenly coated with pulp, or coatings of pulp may be deposited upon forms, from which they may be withdrawn, when dry, by slitting them. In this way globes and other articles may be expeditiously and cheaply formed.

The paper-pulp coatings, when dry, may be polished, varnished, and otherwise finished in the same way in which paper-pulp vessels are now finished, and about which there is nothing new.

I claim as my invention—

1. The combination of the frames A B and the endless carrier with the drum F, provided with the fingers G, for throwing particles of paper-pulp upon articles to be coated, substantially as herein shown and described.

2. The combination of the fan-blower H and the drum F, provided with the fingers G, with the endless carrier and the frames A B, substantially as herein shown and described.

ISAAC JENNINGS.

Witnesses:

T. J. VETTERLEIN,

THOS. P. HOW.